Figure 1:
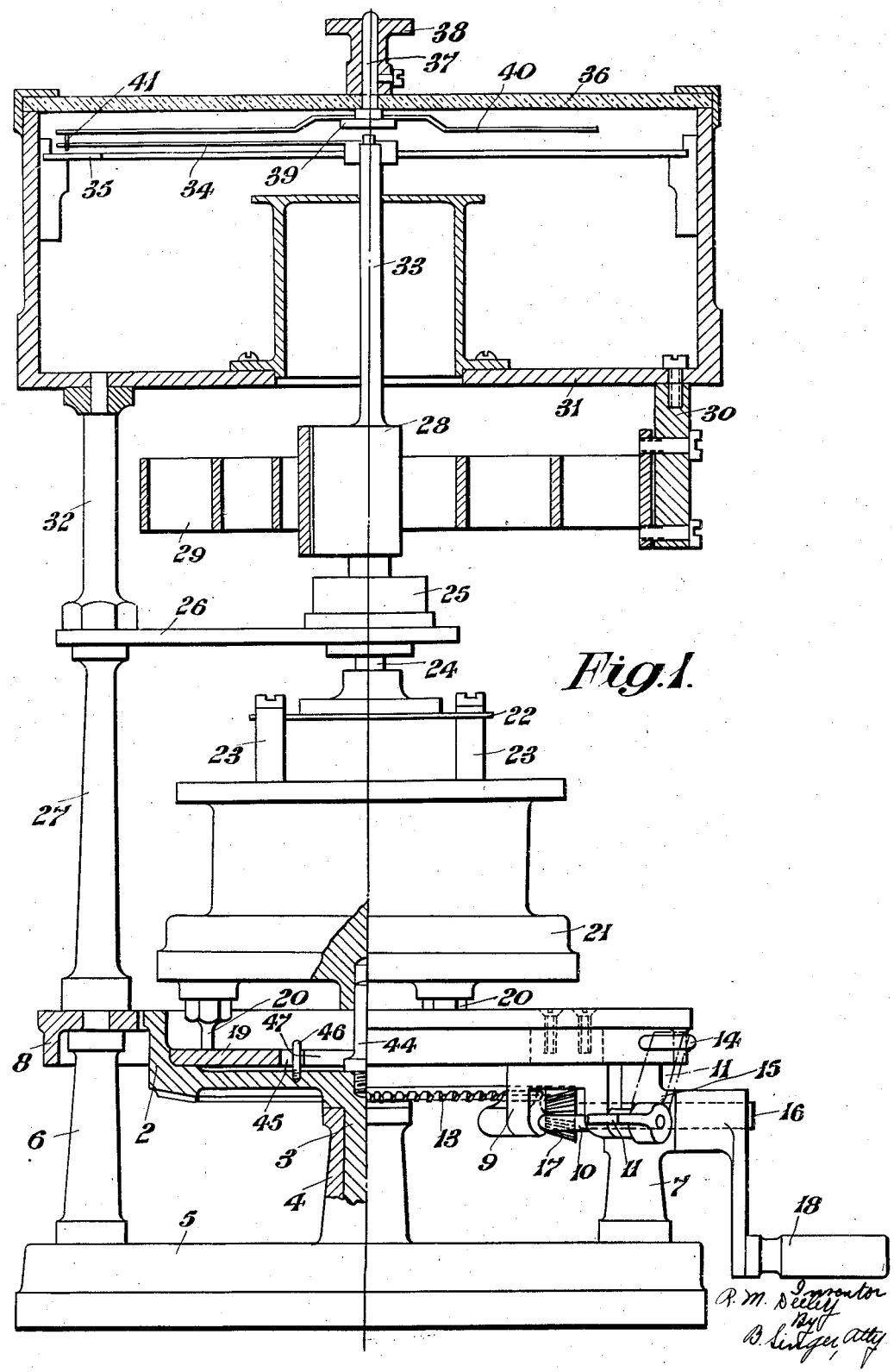

Dec. 2, 1924.

R. M. DEELEY 1,517,410

LUBRICANT AND FRICTION TESTING MACHINE

Filed Aug. 27, 1923 2 Sheets-Sheet 1

Dec. 2, 1924.  1,517,410
R. M. DEELEY
LUBRICANT AND FRICTION TESTING MACHINE
Filed Aug. 27, 1923   2 Sheets-Sheet 2
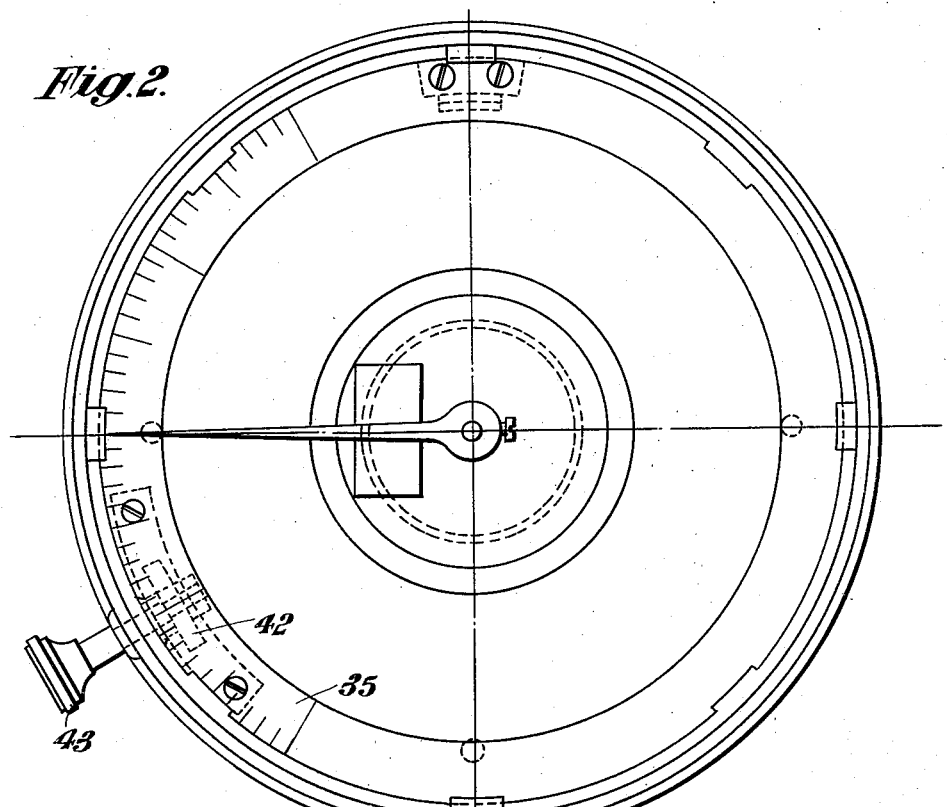
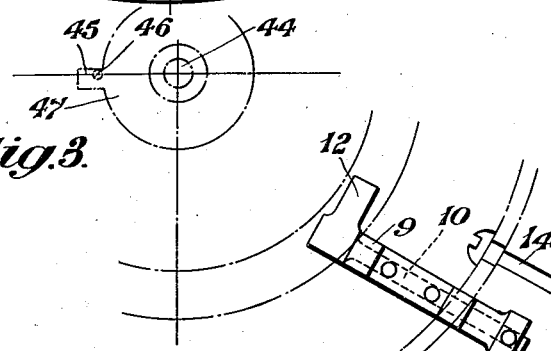
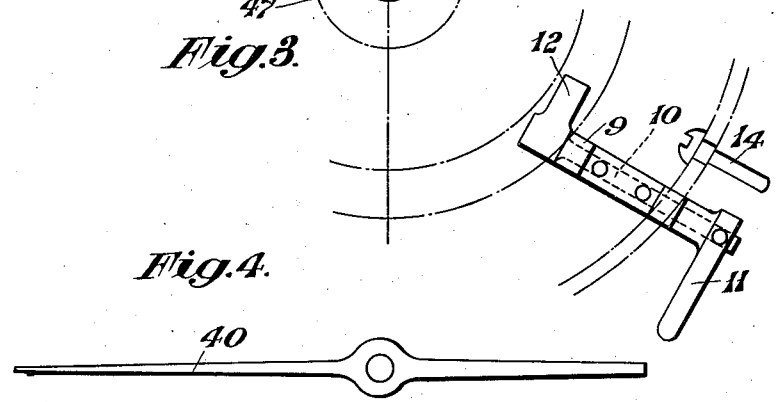
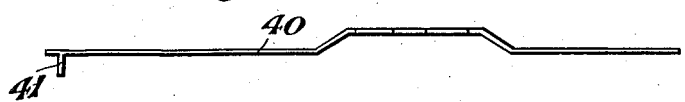

Patented Dec. 2, 1924.

1,517,410

UNITED STATES PATENT OFFICE.

RICHARD MOUNTFORD DEELEY, OF KEW, ENGLAND.

LUBRICANT AND FRICTION TESTING MACHINE.

Application filed August 27, 1923. Serial No. 659,626.

*To all whom it may concern:*

Be it known that I, RICHARD MOUNTFORD DEELEY, a subject of the King of Great Britain, and resident of Kew, in the county of Surrey, England, have invented certain new and useful Improvements in Lubricant and Friction Testing Machines, of which the following is a specification.

This invention relates to lubricant and friction testing machines, and has for its object to provide a sensitive, and easily manipulated efficient machine for these purposes, of simple construction.

In the machine forming the subject of the present invention when used for testing lubricants the lubricant to be tested is placed in a shallow pan rotatably mounted on a vertical axis and in the base of which is a loose friction disc or plate provided with means for preventing its rotation therein, and having a machined, cleaned and oiled upper surface. On this surface rest a number of removable friction pins carried by a member rotatable on a vertical axis and secured to the free end of a coil spring, the other end of the spring being secured to a standard or fixed portion of the machine. By this arrangement when the lubricant pan is rotated the frictional engagement of the friction disc therein with the pins rotates the pin-carrying member about its vertical axis and so places the spring in a condition of strain. On the upper portion of the pin-carrying member is mounted a pointer adapted to move over a fixed scale by an amount corresponding to the strain produced in the spring, and as this is due entirely to the frictional engagement of the friction plate with the friction pins it will vary in extent according to the quality of the lubricant in the lubricant pan, and so be a measure of the static friction and therefore of the quality of the lubricant under test.

The pointer is of the maximum reading type preferably constructed of two portions one fixed to the friction pin carrying member and the other loosely mounted on the same axis and associated therewith in such a manner that it will be carried round by the fixed pointer to a maximum reading and will stay there until returned to zero by hand after the fixed pointer has been returned to zero at the end of the test.

The lubricant pan is provided with spur teeth and pinion gear whereby it can be rotated by a handle, and also with ratchet teeth which may be the same teeth as the spur teeth. A pivoted pawl is arranged to engage these ratchet teeth and is provided with means whereby it can be held in ratchet tooth engaging position or out of such position.

An embodiment of the invention is illustrated by the accompanying drawings wherein:—

Figure 1 is a partly sectional elevation of the machine,

Figure 2 a plan view of the upper or indicating portion of the machine.

Figure 3 a fragmentary plan of the ratchet pawl mechanism,

Figure 4 a plan of a pointer, and

Figure 5 a side elevation of Figure 4.

In these drawings 2 is a shallow lubricant containing pan having a vertical shaft portion 3 mounted in a bearing 4 extending from a bed plate 5 of the machine. Extending from the bed plate 5 are two or more standards 6, 7 on the top of which is supported an annular plate or frame 8.

The frame 8 has secured to its under side a bearing bracket 9 in which is rotatably mounted a pivot shaft 10. At one end of the shaft 10 is fixed a weighted lever 11, while at the other end is fixed a pawl 12 of which the end is shaped to engage spur teeth 13 provided on the under side of the pan 2. The weighted lever 11 is so arranged with respect to the pawl 12 that when in one position, as shown in the drawings, its weight will hold the point of the pawl in engagement with the teeth 13 and so prevent retrograde rotation of the pan when the machine is in use, and when the weighted lever 11 is moved to bring the pawl teeth 12 out of engagement with the teeth 13 it will be held in such position by its weight when moved over to engage a pin 14 extending from the annular frame 8.

In the standard 7 is provided a horizontal bearing 15 in which is mounted a shaft 16 carrying at its inner end a pinion 17, and at its outer end a crank handle 18, which constitutes the operating handle of the machine whereby the lubricant pan can be rotated.

In the base of the pan 2 rests a friction disc or plate 19 having a prepared upper surface on which rests a series of friction pins 20. These friction pins 20 are detachably secured in the under side of a rotatable carrier 21 which operates as a single weight or load on the pins, and the carrier 21 is rotatably mounted on a vertical axis. The rotatable carrier 21 is centered by means of a pin 44 extending upwards from the centre of the pan 2. The friction plate 19 is provided with a central opening 47 in the edge of which is provided a radial slot 45 the sides of which are adapted to be engaged by a pin 46 extending from the pan 2 so as to make a positive driving connection between the pan 2 and the friction disc 19.

In the present example the carrier 21 when rotating engages the free edges of a driver 22 by the upper ends of two diametrically arranged projections 23 extending from the upper portion of the carrier 21. The engagement of the projections 23 with the plate 22 is purely lateral so as not in any way to interfere with the load of the carrier 21 on the friction pins 20.

The driver 22 is fixed at the lower end of a shaft 24 mounted in a vertical bearing 25 secured to an arm 26 fixed at the top of a standard 27 extending from the annular frame 8. On the shaft 24 above the bearing 25 is fixed a boss 28 on which is secured the inner or free end of a coiled spring 29, the other end of the spring being fixed to a bracket 30 secured to a casing 31 containing the indicator mechanism and supported on a standard 32 extending upwards from the arm 26. Into the casing 31 and extending from the boss 28 is a spindle 33 at the upper end of which is fixed a pointer 34 moving over an annular calibrated scale 35 fixed in the casing 31.

At the top of the casing 31 is fixed a glass plate 36, in the centre of which is rotatably mounted a spindle 37, provided with an external rotating knob 38 and an internal flange 39 adapted to freely support a balanced finger or pointer 40 preferably made of aluminium.

The balanced finger or pointer 40 forms a maximum reading pointer and is provided with a downwardly extending projection 41 whereby it can be engaged by the fixed pointer 34 and carried thereby to a maximum reading position over the scale 35. The flange 39 allows of free rotation thereon of the finger 40, but at the same time when the fixed pointer 34 has returned to zero, there is sufficient frictional engagement between the pointer 40 and the flange 39 to enable the pointer being carried round to zero position by the knob 38.

The annular scale 35 may be rotatively mounted in the casing 31 so that its zero can be adjusted, and this can be effected by a friction wheel 42 arranged to engage the under side of the annular scale 35 and be rotated by an adjusting knob 43.

As will be understood from the above, after placing the lubricant to be tested so as to submerge the disc in the pan 2, the ratchet lever 11 is moved away from the top 14 so that its weight will hold the point of the pawl 12 in engagement with the teeth 13, the handle 18 is then rotated and the frictional engagement of the friction plate 19 with the pins 20 will carry round the pointers 34 and 40 against the resistance of the spring 29 an amount varying with the lubricating property of the lubricant in the pan 2.

The machine has been described above for testing lubricants, when used for testing the friction between metals under similar conditions the pins 20 and the friction plate 19 are made of the metal or metals to be tested. The pins 20 may be the same or different metal from the plate 19 according to the nature of the test desired.

What I claim and desire to secure by Letters Patent is:—

1. A lubricant and friction testing machine comprising a rotatable friction plate arranged in the base of a lubricant containing pan and rotatable therewith, a series of friction pins carried on a weighted rotatable member, a maximum indicating pointer associated with the friction pin carrying member, a fixed scale associated with the pointer, a coiled spring having one end fixed and the other connected to the rotatable member, and ratchet mechanism associated with the rotatable pan, the ends of the friction pins being arranged to bear on the friction plate so that their weighted carrying member will be rotated by frictional engagement of the friction plate with the pins when the lubricant pan is rotated and so place the spring in a condition of strain and move the pointer over the scale, the ratchet mechanism being arranged to engage the pan so as to prevent its return by the spring when the driving force is temporarily removed during the rotation of the loaded pan and to be thrown out of operation when it is desired to release the spring and allow the pointer to return in the direction of the zero of the scale.

2. A lubricant and friction testing machine comprising a rotatable friction plate resting in the base of a rotatable lubricant containing pan, a series of friction pins carried on a rotatable member, a single weight for loading the said member, a fixed indicating scale, an indicating pointer consisting of two portions one of which is secured to the friction pin carrying member while the other is loosely mounted on the same axis and movable along the scale by the fixed portion to maximum reading position but not returned thereby, a coiled spring having one end fixed and the other connected to the rotatable member, and ratchet mechanism associated with the rotatable pan, the ends of the friction pins being arranged to bear on the friction plate so that their weighted carrying member will be rotated by frictional engagement of the friction plate with the pins when the lubricant pan is rotated, and so place the spring under tension and move the pointer over the scale, the ratchet mechanism being arranged to engage the pan so as to prevent its return by the spring during the rotation of the loaded pan and to be thrown out of operation to permit the spring to return the indicator from maximum position to zero of the scale.

3. A lubricant and friction testing machine comprising a rotatable friction plate resting in the base of a rotatable lubricant containing pan, a series of friction pins carried on a weighted rotatable member, a maximum indicating pointer movable to indicating position by the friction pin carrying member, a fixed scale associated with the pointer, a coiled spring having one end fixed and the other connected to the rotatable member, and ratchet teeth formed on the pan, a pivoted pawl fixed on a pivot shaft provided with a weighted lever, and a ratchet lever stop, the pawl being held in engagement with the ratchet teeth by the weighted lever when the latter is moved away from the ratchet lever stop and out of engagement therewith when moved against the stop, the ends of the friction pins being arranged to bear on the friction plate so that their weighted carrying member will be rotated by frictional engagement of the friction plate with the pins when the lubricant pan is rotated and so place the spring under tension and move the pointer over the scale, the ratchet mechanism being arranged to engage the pan so as to prevent its return by the spring during the rotation of the loaded pan and to be thrown out of operation to permit the spring to return the indicator to zero of the scale.

4. A lubricant and friction testing machine comprising a friction disc resting in the base of a rotatable lubricant containing pan rotatable on a vertical axis and provided with spur teeth, a rotatable shaft provided with a spur pinion meshing with the teeth on the lubricant pan, and an operating crank, a series of friction pins carried on a weighted rotatable member, a maximum indicating pointer movable to indicating position by the friction pin carrying member, a fixed scale associated with the pointer, a coiled spring having one end fixed and the other connected to the rotatable member, and ratchet mechanism associated with the rotatable pan the ends of the friction pins being arranged to bear on the friction disc so that their weighted carrying member will be rotated by frictional engagement of the friction plate with the pins when the pinion shaft is rotated by the crank handle sufficiently to rotate the lubricant pan by the spur teeth and pinion gears to place the spring under tension and move the pointer over the scale, the ratchet mechanism being arranged to engage the pan so as to prevent its return by the spring during the rotation of the loaded pan and to be thrown out of operation to permit the spring to return the indicator to zero of the scale.

5. A lubricant and friction testing machine comprising a rotatable friction plate resting in the base of a rotatable lubricant containing pan, a series of friction pins carried on a weighted rotatable member, a pointer consisting of two coaxial portions one fixed to the friction pin carrying member and the other freely supported to move independently thereof and provided with a projection adapted to be engaged by the fixed pointer, a fixed scale associated with the pointer, a coiled spring having one end fixed and the other connected to the rotatable member, and ratchet mechanism associated with the rotatable pan the ends of the friction pins being arranged to bear on the friction plate so that their weighted carrying member will be rotated by frictional engagement of the friction plate with the pins when the lubricant pan is rotated and so place the spring under tension and move the fixed pointer into engagement with the projection on the freely supported pointer and so move it over the scale, the ratchet mechanism being arranged to engage the pan so as to prevent its return by the spring during the rotation of the loaded pan and to be thrown out of operation to permit the spring to return the indicator to zero of the scale.

In witness whereof I affix my signature.

RICHARD MOUNTFORD DEELEY.